Dec. 3, 1968 G. M. M. MAGILL ETAL 3,413,864
VARIABLE-RATIO FRICTIONAL DRIVES
Filed March 9, 1967 4 Sheets-Sheet 1

APPLICANTS
George Maurice Martin Magill
Clifford Raymond Schofield and
Richard Nelson Rhodes
BY
  Misegades & Douglas
    ATTORNEYS Dec. 3, 1968  G. M. M. MAGILL ET AL  3,413,864
VARIABLE-RATIO FRICTIONAL DRIVES
Filed March 9, 1967  4 Sheets-Sheet 2

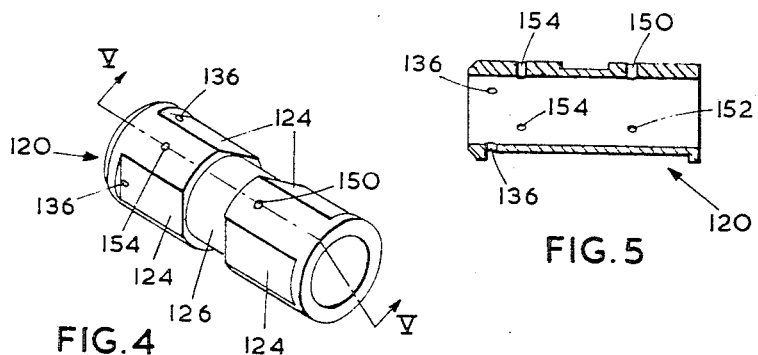
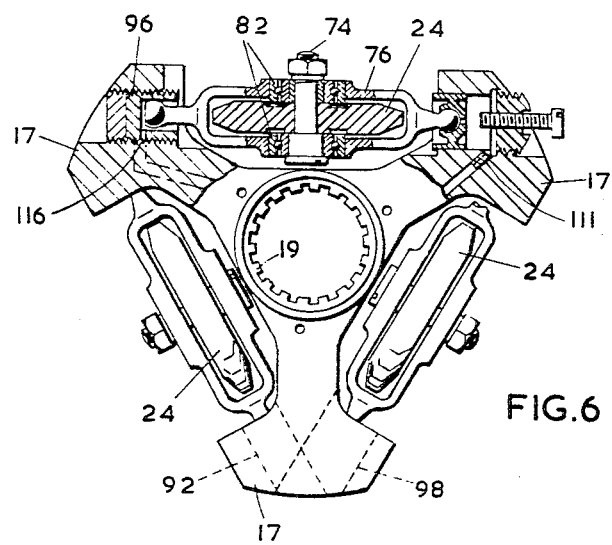
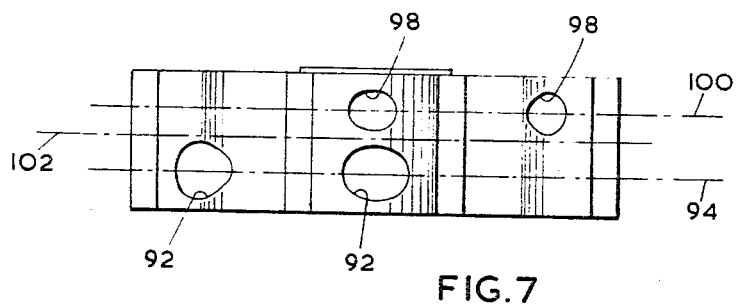

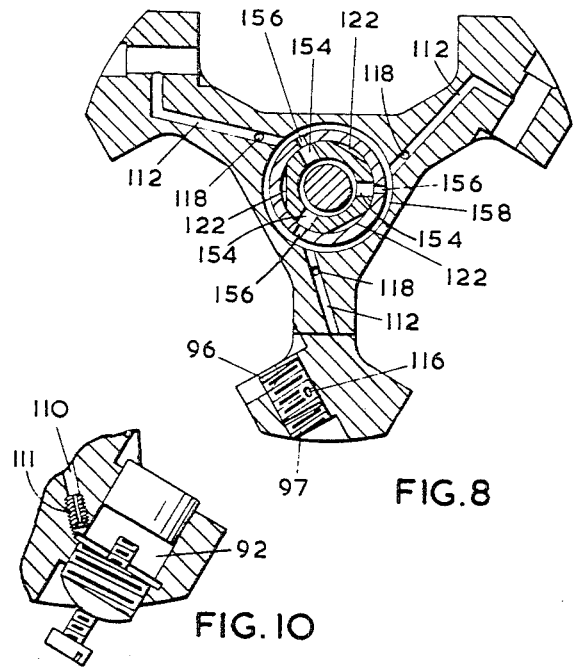
FIG. 8
FIG. 10
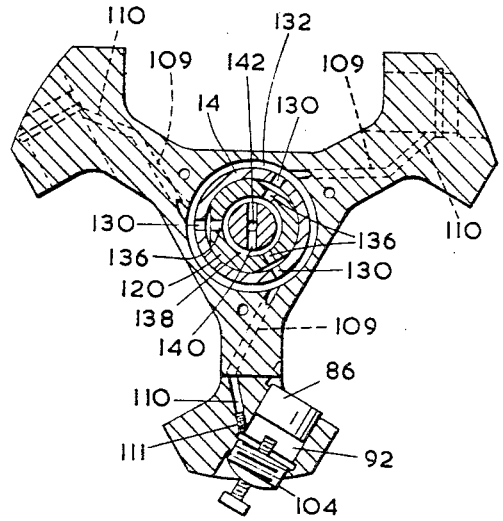
FIG. 9

з,413,864
Patented Dec. 3, 1968

3,413,864
VARIABLE-RATIO FRICTIONAL DRIVES
George Maurice Martin Magill, Clifford Raymond Schofield, and Richard Nelson Rhodes, Bradford, England, assignors to The English Electric Company Limited, London, England, a British company
Filed Mar. 9, 1967, Ser. No. 621,835
Claims priority, application Great Britain, Mar. 9, 1966, 9,962/65
13 Claims. (Cl. 74—200)

ABSTRACT OF THE DISCLOSURE

This invention concerns a variable-ratio frictional drive gear having drive rollers engaging torus discs of which the drive ratio is controlled indirectly by virtue of the rollers being mounted in tangentially movable carriages, each carriage having a hydraulically controlled piston at one end in a pressure cylinder, and a guide piece at the other end movable in a guide cylinder, the guide cylinders and pressure cylinders being on opposite sides of an intermediate plane normal to the gear axis, the roller tilt axes being inclined to that plane.

---

Figure 1:
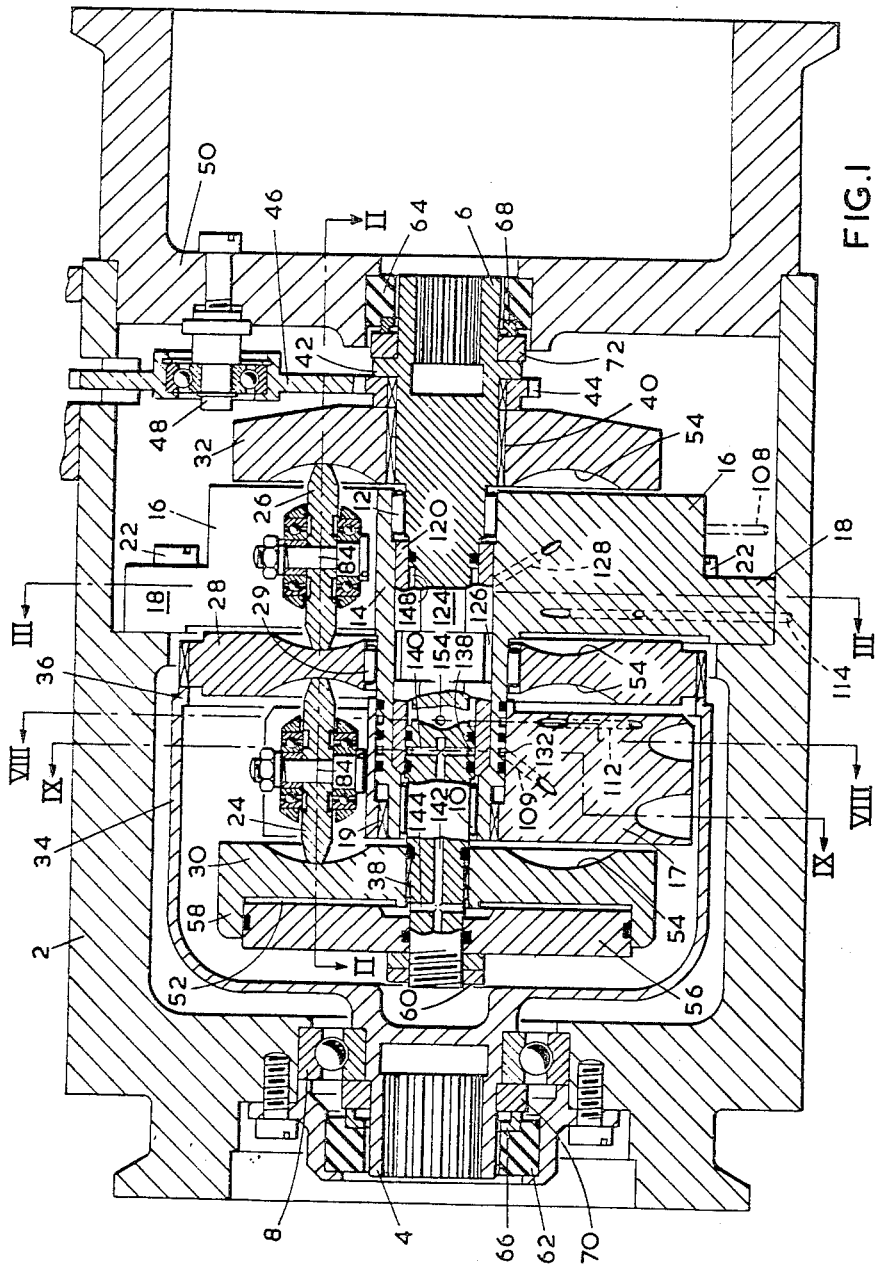

This invention is concerned with variable-ratio fractional drive gears of the kind comprising basically two axially spaced torus discs between which there is a set of circumferentially spaced drive rollers in frictional rolling contact with toroidal surfaces on the discs, each roller being rotatably mounted in a roller carriage which can tilt about an axis at right angles to the axis of rotation of the roller so as to vary the distances from the gear axis at which the roller engages respectively the two discs, thus varying the drive ratio of the gear. The angle of tilt of the roller carriages, as it controls the drive ratio of the gear, is called the "ratio angle."

One way of changing the ratio angle is to tile the roller carriages by means of a positive mechanical linkage. This invention is however concerned with an alternative arrangement which achieves this control indirectly by bodily moving the roller carriages tangentially with respect to the gear axis, and by allowing the rollers then to steer themselves towards a different ratio angle; gears of this general construction will be referred to as "gears with tangentially controlled roller carriages." This invention is more specifically concerned with hydraulic control of gears of this general construction.

This invention is particularly though not exclusively concerned with gears in which the plane of each roller, normal to the axis of rotation of the roller and passing through the points of contact of the roller with the two opposed torus discs, contains the axis about which the roller tilts, being tangential to the torus centre circle (i.e. the locus of the centre of the circle revolved to generate the torus), as distinct from gears in which the same plane for each roller is closed to the main axis of rotation of the gear. The first arrangement, to which this invention is particularly applicable, has its rollers lying diametrically across the torus circle (and may accordnigly be refered to as a 'diametrical-roller" gear) as opposed to the second arrangement, which has chordal rollers of smaller diameter than the torus circle.

A gear according to this invention comprises two axially spaced torus discs between which there is a set of circumferentially spaced drive rollers in frictional rolling contact with toroidal surfaces on the discs, each roller being rotatably mounted in a tangentially controlled roller carriage having end portions lying on a roller tilt axis at right angles to the axis of rotation to the roller, the end portions of each roller carriage being slidably and rotatably supported by the arms of a spider member whereby the roller carriages can be moved tangentially in order to control indirectly the ratio angle of the rollers, characterised in that one end portion of each roller carriage has a piston which is slidable in a pressure cylinder in one of the spider arms, and the other end portion has a guide piece slidable in a guide cylinder in another of the spider arms, each spider arm having a pressure cylinder for one roller carriage and a guide cylinder for the adjacent roller carriage, the pressure and guide cylinders being formed with their axes lying in two different planes which are both normal to the gear axis, so that the tilt axis of each roller carriage is inclined to both these planes, the pressure cylinders and guide cylinders being respectively entirely on opposite sides of an intermediate plane lying between and parallel to the other two planes.

Figure 2:
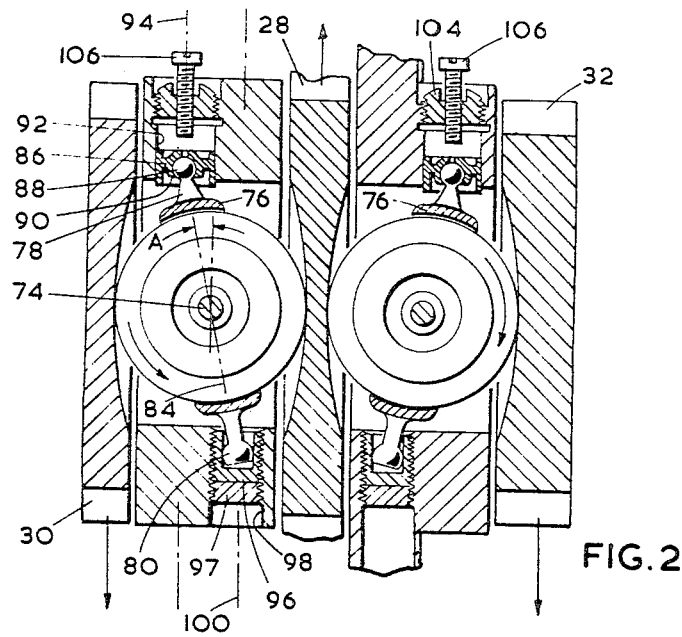
Figure 3:
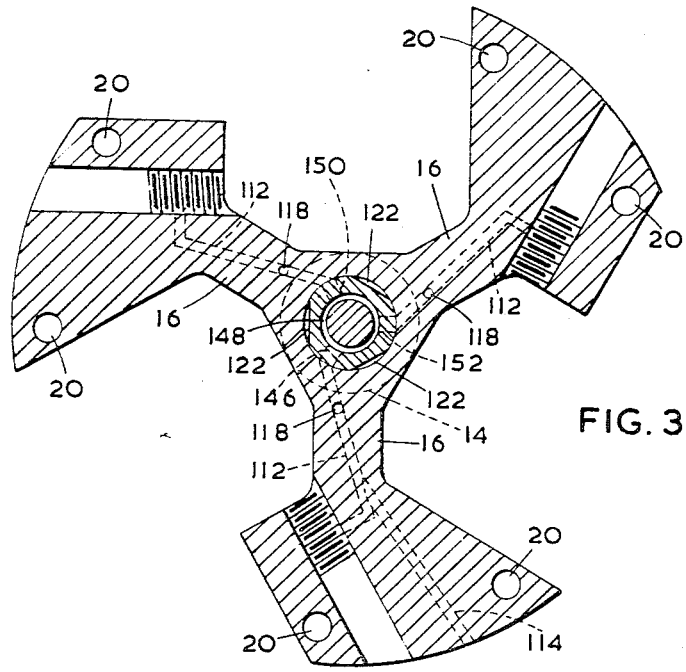

A preferred gear according to this invention is shown in the accompanying drawings. In these drawings:
FIGURE 1 is a longitudinal section of the gear;
FIGURE 2 is a fragmentary section on the line II—II in FIGURE 1;
FIGURE 3 is a section of the main spider member on the line III—III in FIGURE 1;
FIGURE 4 is a perspective view of a sleeve which defines oil flow passages;
FIGURE 5 is a longitudinal section of the sleeve on the line V—V in FIGURE 4;
FIGURE 6 is a partly sectioned end view of the secondary spider member showing the rollers in position;
FIGURE 7 is a side view of the spider member shown in FIGURE 6, taken from below FIGURE 6 but without the rollers;
FIGURE 8 is a section of the spider member shown in FIGURE 6, taken along the line VIII—VIII in FIGURE 1;
FIGURE 9 is a section similar to FIGURE 8 but taken on the line IX—IX in FIGURE 1; and
FIGURE 10 is an enlarged detail of the bottom part of FIGURE 9.

The gear shown in the drawings has a casing 2 with an input shaft 4 and an output shaft 6. The input shaft 4 is mounted in a ball bearing 8 at the left-hand end of the casing, while the output shaft 6 is mounted in two needle roller bearings 10 and 12 in an integral sleeve-like hub portion 14 of a main spider member (shown particularly in FIGURE 3) having three radial arms 16. Each of the arms 16 has a flange end portion 18 with two holes 20 for bolts 22 by which the main spider member is secured in the casing 2 of the gear.

There are two sets of driving rollers, each set having three rollers 24 and 26 respectively. The rollers 24 are in driving engagement between a middle torus disc 28 and an end torus disc 30, while the rollers 26 are in driving engagement between the middle torus disc 28 and an end torus disc 32. The middle torus disc 28 is driven by the input shaft 4 via a drum 34 which has dog teeth 36 engaging in axial recesses around the disc 28 so as to permit relative axial movement between the disc 28 and the drum 34. The end discs 30 and 32 have splines 38 and 40 engaging the output shaft, while the middle torus disc 28 is mounted around a needle roller bearing 29.

The rollers 26 are carried by the arms 16 of the main spider member, while the rollers 24 are carried by arms 17 of a secondary spider member (see particularly FIGURE 6) which is generally similar to the main spider member except for the absence of the mounting flange portions 18. Instead the secondary spider member is mounted on the end of the hub sleeve 14 of the main spider member with an axial spline 19 which restrains the secondary spider member against rotation while allowing axial movement.

Between the end disc 32 and a flange 42 on the output shaft there is gear wheel 44 which drives an idler gear wheel 46 mounted on a spindle 48 secured to an end casing member 50. The idler gear 46 drives a further gear wheel (not shown) lying outside the casing 2 and coupled to a shaft which drives both a pump and a governor. This will be explained further on in more detail.

The end disc 32 does not move with respect to the output shaft 6 during use, being firmly pressed against the gear 44, which in turn is backed by the flange 42 on the output shaft. On the other hand, the end disc 30 is axially movable with respect to the output shaft and is urged to the right during use by hydraulic pressure in a chamber 52 in order to provide the necessary driving reaction between the rollers and the toroidal surfaces 54 of the torus discs. The chamber 52 is defined by the disc 30 and by a fixed circular plate 56 which serves in effect as a piston within a cylindrical space defined by a flange 58 on the disc 30. Lock-nuts 60 on the left-hand end of the shaft 6 retain the circular plate 56 on the output shaft 6.

Seals 62 and 64 prevent the escape of oil through leakage passages between the input and output shafts and the surrounding casing parts. These seals include rings 66 and 68 which are pressed firmly against wear pads 70 and 72, the wear pads being stationary while the rings rotate with the shafts.

Each roller is mounted by means of a bolt 74 in a roller carriage comprising a yoke 76 with end portions 78 and 80. The bolt 74 in each case serves as a spindle which rotates in bearings 82 mounted in the yoke 76. The bearings 82 are shown, for the purpose of illustration, as ball bearings, but in practice we prefer to use roller bearings allowing the bolt a slight freedom of axial movement to enable each roller to position itself in precisely the correct stable position.

As shown in FIGURE 2, the end portions 78 and 80 of each roller carriage lie on a tilt axis 84 about which the roller carriage can tilt to change the distances from the gear axis at which the roller engages its two co-operating torus discs. The rollers are shown in FIGURE 1 in the positions in which they transmit a 1:1 gear ratio. It will be understood that, in order to transmit a stepped-up gear ratio the rollers with their roller carriages would tilt about the axes 84 in order to engage the centre torus disc 28 at points close to the gear axis, and in order to transmit a stepped-down gear ratio the roller carriages would tilt in the opposite direction so as to bring the rollers into engagement with the centre torus disc 28 at a greater distance from the gear axis. As viewed in FIGURE 1, the rollers of the two sets always tilt in opposite directions.

As shown in FIGURE 2, the end portion 78 of each roller carriage is universally connected to a piston 86 which has a part-spherical socket in which a ball end 88 on the roller carriage engages. An internal flange 90 in the piston is peened inwards after insertion of the ball end 88 so as to trap the ball end in the socket. The piston 86 is slidable in a pressure cylinder 92 arranged with its axis in a plane 94 normal to the gear axis.

The end portion 80 of each roller carriage is slidably mounted in a guide cylinder defined by a threaded sleeve 96, which is screwed into a bore 98 in another arm of the spider member, and is locked in position by a threaded plug 97. The guide cylinder defined by the sleeve 96 has its axis lying in a plane 100 which is also normal to the gear axis.

As shown particularly in FIGURE 7, the pressure and guide cylinders lie entirely on opposite sides of an intermediate plane 102 lying between and parallel to the planes 94 and 100. In fact, in the case of the guide cylinder, not only the cylinder itself (i.e. the cylindrical wall guiding the guide end 80) but also the entire sleeve 96 lie to one side of the intermediate plane 102. Accordingly the bore 98 and the pressure cylinder bore can be drilled right through each spider arm without intersecting; as shown in FIGURE 6 these bores do overlap as viewed in a direction parallel to the gear axis. This arrangement is important because it enables the gear to be constructed as compactly as possible with as large a roller diameter as possible. Moreover this arrangement results in a large camber angle; that is to say a large angle of inclination between each roller carriage tilt axis 84 and a plane normal to the gear axis. The camber angle (12°) is the angle A shown in FIGURE 2. We have found that, contrary to beliefs hitherto held, it is best to use a large camber angle lying preferably approximately within the range 10° to 15°. We have found that a large camber angle gives rise to a new and highly desirable mode of damping which can virtually eliminate any tendency for ratio angle oscillation and facilitates the design of a highly stable gear without the need for elaborate additional damping devices for achieving the necessary damping. The incorporating of a large camber angle is greatly facilitated by the present invention.

The effect produced by the camber angle can be best explained with reference to FIGURE 2.

The directions of movement of the torus discs are indicated by the arrows in FIGURE 2. The transmission of torque by the rollers produces a torque reaction on the roller carriages urging the pistons 86 into the pressure cylinders 92. As shown in FIGURE 2 the pistons are at nearly the extremes of their travel out of the cylinders 92. The limits of movement into the cylinders are determined by stop screws 106 in screw-threaded plugs 104 which close the ends of the pressure cylinders. When midway between their extreme positions, the roller carriages produce a 1:1 drive ratio in which the rollers engage the torus discs at the same distance from the gear axis (as shown in FIGURE 1); each roller axis of rotation 74 at this stage intersects the gear axis and is precisely at right angles to the gear axis. If then the roller carriages are displaced tangentially by an increased pressure acting on the pistons, against the direction of the torque reaction (i.e. downwards as viewed in FIGURE 2), equilibrium is destroyed because the roller axes no longer intersect the gear axis. As a result steering forces are imposed on the rollers by the torus discs so as to tilt the roller carriages about their tilt axes 84 until equilibrium is again restored by virtue of the roller axes 74 again intersecting the gear axis, the degree of tilt (i.e. the amount of ratio angle change) being dependent on the amount of tangential displacement. Tangential displacement in the opposite direction (i.e. by reducing the pressure acting on the pistons 90) results in tilting of the rollers in the opposite direction.

It should be noted that the gear shown is a diametrical roller gear. The diametrical arrangement of the rollers shows most clearly in FIGURE 1. As viewed in FIGURE 1, each roller lies along a diameter of the imaginary circle which generates the torus defining the opposed toroidal surfaces 54. In other words, the centre of each roller lies on its tilt axis 84.

Each pressure cylinder is fed with control oil delivered into the gear through a passageway 108 shown diagrammatically in FIGURE 1. This oil is distributed from the centre of each spider member through passageways 109, 110 shown best in FIGURE 9. These passageways are formed by drilling intersecting holes and then plugging up the redundant parts where necessary.

At the end of each passageway 110 adjacent to the pressure cylinder there is a screwed-in plug 111 (see FIGURE 10) which has a restricted orifice so as to damp any tendency which might arise for the pistons to oscillate in the pressure cylinders. If the oil passageways in general are, for example, of ⅛ inch diameter, the restricted orifices in the plugs 111 may consist of bores of 1/32 inch diameter.

A further set of passageways 112 in each spider (shown in FIGURES 3 and 8) is fed with lubricating oil distributed also from the centre of the gear, the lubricating oil being supplied to the gear through a passageway 114 in the main spider member. As shown in FIGURE 6, the lubricating oil is fed to each guide cylinder through a lateral hole 116. Lubrication is provided for the rollers through axial holes 118 passing through the passageways 112 and extending right through the spider arms. Each hole 118 delivers a spray of oil at each end to the adjacent toroidal face 54 in an area near the inner periphery of the toroidal face.

The control oil and lubricating oil are separated at the centre of the gear by a fixed sleeve 120 shown particularly in FIGURES 4 and 5, the control oil being in three circumferentially-spaced axially-extending channels 122 defined by cut-away flat surfaces 124 on the outside of the sleeve 120. The three channels communicate with one another through a circumferential groove 126. Control oil from the passageway 108 enters the right-hand end of one of the three channels 122 through an oblique passageway 128 shown in FIGURE 1, and some oil also enters a passageway similar to the passageways 110 in the secondary spider member (see FIGURE 9), leading to one of the pressure cylinders. Similar passageways from the ends of the other channels 122 (i.e. similar to the passageways 109, 110 shown in FIGURE 9) supply control oil to the pressure cylinders in the other arms of the main spider member. At the left-hand end of the channels 122 there are three radial holes 130 (see FIGURE 9) which pass through the hub sleeve 14 of the main spider member and lead to a circumferential groove 132 in the hub sleeve which communicates with the oblique passageway sections 109 which lead via the sections 110 to the pressure cylinders in the arms of the secondary spider member.

In line with the radial holes 130 through the fixed hub sleeve 14 there are holes 136 passing through the sleeve 120 and communicating with a circumferential groove 138 in the output shaft 6. From this grooves 138 control oil is drawn through a diametral bore 140 which communicates with an axial bore 142 which in turn communicates with the chamber 52 via a further diametral bore 144. Accordingly control oil, which is at the same pressure as the oil in the pressure cylinders, fills the chamber 52 and urges the torus disc 30 away from the fixed circular plate 56 to provide the necessary axial loading which enables the rollers to transmit a torque through frictional contact with the torus discs.

Lubricating oil fed into the gear through the passageway 114 and via one of the passageways 112 passes through a radial hole 146 (see FIGURE 3) in the sleeve 120 and thus enters an annular space 148 defined by the sleeve 120 and output shaft 6. From this annular space 148 lubricating oil flows through further radial holes 150 and 152 to the lubrication passageways 112 in the other arms of the main spider member, as shown in FIGURE 3. Lubricating oil for the secondary spider member passes from the left-hand end of the annular space 148 through the radial holes 154 (see FIGURE 8) and through aligned holes 156 in the fixed hub sleeve 14 into a circumferential groove 158 in the hub sleeve 14, from where the lubricating oil can pass into the passages 112 in the secondary spider member.

By virtue of the fact that the same oil is fed to the pressure cylinders and to the axial loading chamber 52, the axial loading force by which the torus discs are urged together will always be proportional to the pressure in the pressure cylinders. Thus the axial loading is automatically maintained substantially at an appropriate value which is at all times neither too low nor unnecessarily high for permitting the rollers to achieve the required frictional transmission.

The sleeve 120 is fixed in the hub sleeve by virtue of being a force fit in the hub sleeve. Moreover the sleeve is given a thin external coating of adhesive before being driven into the hub sleeve. The force fit and adhesive ensure an adequate seal around the control oil flow paths within the hub sleeve. Various further seals are formed, as shown, by O-rings particularly in external circumferential grooves in the shaft 6 and hub sleeve.

It should be noted that the needle roller bearings 10 and 12 by which the output shaft 6 is mounted in the fixed hub sleeve 14 lie inboard of the outer torus discs 30 and 32. This manner of layout leads to a particularly compact and convenient construction.

As already mentioned, the idler gear wheel 46 drives a gear (not shown) on a shaft which drives a pump and a governor. The pump is that which provides the necessary control oil for the pressure cylinders and axial loading chamber 52. The same pump may also deliver lubricating oil; alternatively a separate pump may be used for lubricating oil, and this pump may be driven together with the control oil pump.

Control oil should be at a relatively high pressure, preferably up to about 500 pounds per square inch, though a gear according to this invention may be arranged to operate with a control oil pressure rising, when necessary, to a still higher value of, for example, 1000 pounds per square inch. The lubricating oil, on the other hand, should be at a lower pressure, for example up to about 30 pounds per square inch.

The governor in one particular application of this gear may be used to maintain a constant output speed; for this purpose the overnor would control the output pressure of the pump in response to the output speed, so as to decrease the pressure when the speed rises, and vice versa. A constant speed gear made in this manner is suitable for use in driving, for example, an aircraft alternator with power derived from the aircraft engine.

The gear casing may be enlarged to enable the governor and the pump (or pumps) to be mounted in the casing.

Though the gear shown is intended to be used with the shaft 4 as the input shaft, it is alternatively basically capable of being used with the shaft 6 as the input shaft and with the shaft 4 as the output shaft; in this case, however, the directions of rotation of the shafts would need to be reversed in order to achieve a torque reaction on the roller carriages in the direction urging the pistons into the pressure cylinders, and the governor and pump would be driven by the shaft 4 if the gear were required to maintain a constant output speed.

For use as a constant speed drive for an aircraft alternator, a gear according to this invention may be of a size such as to transmit, for example, a power of 10 k.v.a. to 15 k.v.a., or greater, at a constant output speed of 8000 r.p.m.

As an alternative to the constant speed arrangement just described, the pump supplying control oil may be controlled in response to other operating criteria. It may, for example, be controlled by a device sensitive to input torque or output torque so as to vary the control pressure and consequently the gear ratio to maintain either of these torques constant.

We claim:
1. A variable-ratio frictional drive gear comprising two axially spaced torus discs between which there is a set of circumferentially spaced drive rollers in frictional rolling contact with toroidal surfaces on the discs, each roller being rotatably mounted in a tangentially controlled roller carriage having end portions lying on a roller tilt axis at right angles to the axis of rotation to the roller, the end portions of each roller carriage being slidably and rotatably supported by the arms of a spider member whereby the roller carriages can be moved tangentially in order to control indirectly the ratio angle of the rollers, characterised in that one end portion of each roller carraige has a piston which is slidable in a pressure cylinder in one of the spider arms, and the other end portion has a guide piece slidable in a guide cylinder in another of the spider arms, each spider arm having a pressure cylinder for one roller carriage and a guide cylinder for the adjacent roller carriage, the pressure and guide cylinders being formed with their axes lying in two different planes which are both normal to the gear axis, so that the tilt axis of each roller in inclined to both these planes, the pressure cylinders and guide cylinders being respectively entirely on opposite sides of an intermediate plane lying between and parallel to the other two planes.

2. A gear according to claim 1 in which the angle of inclination of the tilt axis of each roller to a plane normal to the gear axis lies approximately within the range 10° to 15°.

3. A gear according to claim 2 in which the angle of inclination is approximately 12°.

4. A gear according to claim 1 in which the plane of each roller normal to the axis of rotation of the roller and passing through the points of contact of the roller with the two opposed torus discs contains the axis about which the roller tilts, being tangential to the torus centre circle.

5. A gear according to claim 1 in which the piston of each roller carriage is formed separately from the roller carriage and has a ball-and-socket connection with the roller carriage end portion.

6. A gear according to claim 1 in which there are two sets of rollers driving between three axially spaced torus discs of which the two end discs are both coupled to a central shaft which is rotatably supported by bearings within a hub sleeve of a main spider member supporting one of the sets of rollers and having means at the outer ends of its radial arms by which it is secured in a gear casing, the other set of rollers being carried by a secondary spider member which is mounted on a free end of the hub sleeve with a spline or equivalent inter-connection which prevents rotation of the secondary spider member while permitting slight axial movement with respect to the hub sleeve.

7. A gear according to claim 6 in which passageways in the arms of the two spider members for supplying control oil to the pressure cylinders are connected to an inlet passage via an oil flow path within the hub sleeve, and in which there are further passages in the arms of the spider members for supplying lubricating oil to various points where necessary, these lubricating oil passageways being supplied with oil via a second oil path within the hub sleeve, one oil flow path being between the hub sleeve and a fixed intermediate sleeve, and the other path being between the intermediate sleeve and the central shaft of the gear.

8. A gear according to claim 7 in which the oil flow path between the intermediate sleeve and the central shaft is an annular space and in which the oil flow path between the intermediate sleeve and the hub sleeve comprises a number of circumferentially spaced axial channels each supplying oil to one arm of each spider member, the annular space being in communication with the appropriate passageways in the spider arms through holes passing through the intermediate sleeve between the axial channels.

9. A gear according to claim 8 in which the axial channels serve as the flow path for control oil, the annular space being the flow path for lubrication oil.

10. A gear according to claim 1 in which the necessary axial force urging the torus discs together is provided by oil pressure acting on the end face of one of the torus discs, the oil for this purpose being from the same source as the control oil delivered to the pressure cylinders of the roller carriages.

11. A gear according to claim 9, in which oil for providing the axial force on the torus discs is drawn, via an axial bore in the central shaft, from one or more of the axial channels through one or more radial holes passing through the sleeve at a region lying beyond the end of the annular lubrication oil space within the sleeve.

12. A variable-ratio frictional drive gear comprising two co-axially rotatable, axially spaced torus discs; a set of circumferentially spaced diametrical drive rollers in frictional rolling contact with toroidal surfaces on the discs; a set of circumferentially spaced roller carriages each rotatably mounting one of the rollers and having end portions lying on a tilt axis at right angles to the axis of rotation of the associated roller, the tilt axis being in a plane which is normal to the axis of rotation of the roller and passes through the points of contact of the roller with the co-operating torus discs; a fixed spider member having radial arms with means supporting the roller carriages, the said means comprising for each roller carriage a pressure cylinder formed in one spider arm and containing a piston associated with one end portion of the roller carriage, and a guide cylinder formed in an adjacent spider arm and slidably mounting the other end formed with a pressure cylinder for one roller carriage and a guide cylinder for the adjacent roller carriage, the pressure cylinders in the different spider arms all lying with their axes in a plane normal to the axis of rotation of the torus discs, and the guide cylinders in the different spider arms all lying with the axes in a different plane normal to the axis of rotation of the torus discs, the two planes being axially spaced from one another by an amount whereby the tilt axis of each roller carriage extends obliquely between the two planes at an angle of inclination to each plane lying within the range 10° to 15°.

13. A variable-ratio frictional drive gear comprising a casing; a central shaft; three co-axially rotatable, axially spaced torus discs, namely a middle disc and two end discs, having two pairs of toroidal faces, the end discs being secured for rotation with the central shaft; two sets of circumferentially spaced drive rollers each extending diametrically between one pair of toroidal surfaces in frictional rolling contact with the toroidal surfaces; a plurality of circumferentially spaced roller carriages each rotatably mounting one of the rollers and having end portions lying on a tilt axis at right angles to the axis of rotation of the associated roller; a main spider member having radial arms extending outwards from a hub sleeve portion with means at their radial extremities for securing the main spider member to the gear casing, the hub sleeve having bearing means rotatably supporting within it the central shaft, and being arranged to pass through and rotatably support the middle torus disc; a secondary spider member mounted around a free end of the hub sleeve of the main spider member, with means preventing relative rotation between the secondary spider member and the hub sleeve while permitting freedom of slight relative axial movement; a drum member surrounding the secondary spider and coupling the middle torus disc to a second central shaft coaxial with the first-mentioned shaft; and means associated with the two spider members for supporting respectively the two sets of roller carriages, the said means for each spider member comprising for each roller carriage a pressure cylinder formed in one spider arm and containing a piston associated with one end portion of the roller carriage, and a guide cylinder formed in an adjacent spider arm and slidably mounting the other end portion of the roller carriage, each spider arm been formed with a pressure cylinder for one roller carriage and a guide cylinder for the adjacent roller carriage, the pressure cylinders in the different spider arms all lying with their axes in a plane normal to the axis of rotation of the torus discs, and the guide cylinders in the different spider arms all lying with the axes in a different plane normal to the axis of rotation of the torus discs, the two planes being axially spaced from one another by an amount whereby the tilt axis of each roller carriage extends obliquely between the two planes at an angle of inclination to each plane lying within the range 10° to 15°.

References Cited

UNITED STATES PATENTS 3,276,279   10/1966   De Brie Perry et al. ____ 74—200
3,277,745   10/1966   Harned et al. _____ 74—200

C. J. HUSAR, *Primary Examiner*.